(12) United States Patent
Faubert et al.

(10) Patent No.: US 8,310,458 B2
(45) Date of Patent: Nov. 13, 2012

(54) ELECTRONIC DEVICE INCLUDING A MOVEABLE TOUCH-SENSITIVE INPUT AND METHOD OF CONTROLLING SAME

(75) Inventors: Perry Allan Faubert, Kitchener (CA); Jason Tyler Griffin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 678 days.

(21) Appl. No.: 12/497,724

(22) Filed: Jul. 6, 2009

(65) Prior Publication Data

US 2011/0001707 A1 Jan. 6, 2011

(51) Int. Cl.
*G06F 3/041* (2006.01)
(52) U.S. Cl. ........ 345/173; 345/156; 345/158; 715/701; 715/702; 178/18.01
(58) Field of Classification Search .......... 345/173–178, 345/158; 178/18.01–18.09; 715/701, 702
See application file for complete search history.

(56) References Cited

U.S. PATENT DOCUMENTS

| | | | |
|---|---|---|---|
| 2004/0156168 A1* | 8/2004 | LeVasseur et al. | 361/681 |
| 2005/0280746 A1* | 12/2005 | North et al. | 349/12 |
| 2006/0017692 A1* | 1/2006 | Wehrenberg et al. | 345/156 |
| 2006/0022952 A1* | 2/2006 | Ryynanen | 345/173 |
| 2006/0119586 A1 | 6/2006 | Grant et al. | |
| 2006/0181517 A1* | 8/2006 | Zadesky et al. | 345/173 |
| 2007/0013677 A1* | 1/2007 | Rosenberg et al. | 345/173 |
| 2008/0122315 A1* | 5/2008 | Maruyama et al. | 310/314 |
| 2008/0214160 A1* | 9/2008 | Jonsson | 455/414.2 |

FOREIGN PATENT DOCUMENTS

| | | |
|---|---|---|
| EP | 1542064 A | 6/2005 |
| WO | 2004/107808 A | 12/2004 |

OTHER PUBLICATIONS

Lashkari et al., Loudspeaker Linearization Using Perceptual Distortion Measures, Signals, Systems and Computers, 2003, pp. 745-749, vol. 1, IEEE, San Jose, USA.
Raising the Standards for Mobile Phone Audio, Jul. 6, 2009, www.nxtsound.com/index?id=406.
EESR issued in corresponding European Patent Application EP 09164676 dated Nov. 24, 2009.
Poupyrev I et al, "Tactile Interfaces for Small Touch Screens" Jan. 1, 2003.

* cited by examiner

*Primary Examiner* — Amare Mengistu
*Assistant Examiner* — Koosha Sharifi-Tafreshi
(74) *Attorney, Agent, or Firm* — Geoffrey deKleine; Borden Ladner Gervais LLP

(57) ABSTRACT

An electronic device includes a housing including a base, a touch-sensitive input assembly coupled to the housing and spaced from and moveable relative to the base to generate sound, an accelerometer housed within the housing, an actuating arrangement comprising a piezoelectric actuator between the base and the touch-sensitive input surface and arranged to receive a driving signal and move the touch-sensitive input surface relative to the base, and functional components in the housing comprising a memory and a processor operably coupled to the memory, the touch-sensitive input assembly, the actuating arrangement, and the accelerometer to execute a program stored in the memory to determine an orientation of the electronic device and adjust the driving signal to the actuating arrangement based on the orientation of the electronic device.

15 Claims, 6 Drawing Sheets

ELECTRONIC DEVICE INCLUDING A MOVEABLE TOUCH-SENSITIVE INPUT AND METHOD OF CONTROLLING SAME

FIELD OF TECHNOLOGY

The present disclosure relates to portable electronic devices that include a touch-sensitive input device such as a touch-sensitive display and the provision of tactile feedback and the generation of sound using such input devices.

BACKGROUND

Electronic devices, including portable electronic devices, have gained widespread use and may provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities. Touch-sensitive input devices are useful for input on a portable electronic device.

Devices such as PDAs or smart telephones are generally intended for handheld use and ease of portability. Smaller devices are generally desirable for portability. Touch screen devices constructed of a display, such as a liquid crystal display, with a touch-sensitive overlay are useful on such handheld devices as such handheld devices are small and are therefore limited in space available for user input and output devices. Further, the screen content on the touch screen devices can be modified depending on the functions and operations being performed.

Further improvements are largely driven by industry demand for the reduction of size of such electronic devices.

BRIEF DESCRIPTION OF THE DRAWINGS

Embodiments of the present disclosure will now be described, by way of example only, with reference to the attached Figures, wherein.

DETAILED DESCRIPTION

Figure 1:
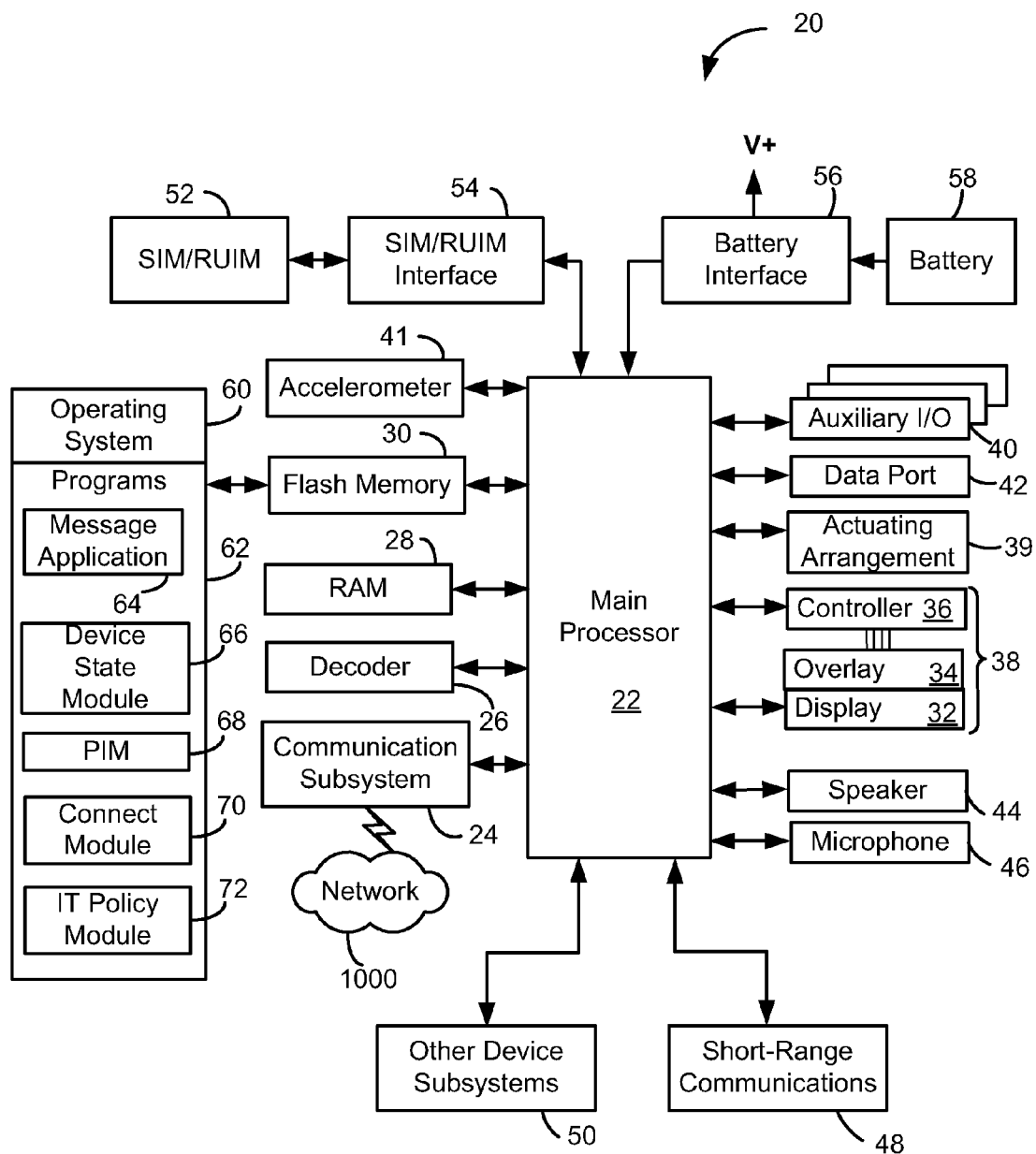
FIG. 1 is a simplified block diagram of components including internal components of a portable electronic device according an aspect of an embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers and the like.

The portable electronic device may be a two-way communication device with advanced data communication capabilities including the capability to communicate with other portable electronic devices or computer systems through a network of transceiver stations. The portable electronic device may also have the capability to allow voice communication. Depending on the functionality provided by the portable electronic device, it may be referred to as a data messaging device, a two-way pager, a cellular telephone with data messaging capabilities, a wireless Internet appliance, or a data communication device (with or without telephony capabilities). The portable electronic device may also be a portable device without wireless communication capabilities as a handheld electronic game device, digital photograph album, digital camera and the like.

Referring to FIG. 1, there is shown therein a block diagram of an example of an embodiment of a portable electronic device 20. The portable electronic device 20 includes a number of components such as the processor 22 that controls the overall operation of the portable electronic device 20. Communication functions, including data and voice communications, are performed through a communication subsystem 24. Data received by the portable electronic device 20 may be decompressed and decrypted by a decoder 26, operating according to any suitable decompression techniques (e.g. YK decompression, and other known techniques) and encryption techniques (e.g. using an encryption technique such as Data Encryption Standard (DES), Triple DES, or Advanced Encryption Standard (AES)). The communication subsystem 24 receives messages from and sends messages to a wireless network 1000. In this example of the portable electronic device 20, the communication subsystem 24 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 24 with the wireless network 1000 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 1000 associated with the portable electronic device 20 is a GSM/GPRS wireless network in one example of an implementation, other wireless networks may also be associated with the portable electronic device 20 in variant implementations. The different types of wireless networks that may be employed include, for example, data-centric wireless networks, voice-centric wireless networks, and dual-mode networks that support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The processor 22 also interacts with additional subsystems such as a Random Access Memory (RAM) 28, a flash memory 30, a display 32 with a touch-sensitive overlay 34 connected to an electronic controller 36 that together are part of a touch-sensitive input assembly 38, an auxiliary input/output (I/O) subsystem 40, an accelerometer 41 a data port 42, a speaker 44, a microphone 46, short-range communications 48 and other device subsystems 50. The touch-sensitive overlay 34 and the electronic controller 36 provide a touch-sensitive input device and the processor 22 interacts with the touch-sensitive overlay 34 via the electronic controller 36. An actuating arrangement 39 is connected to and communicates with the processor 22.

The accelerometer 41 may be a three-axis accelerometer and is used for detecting direction of gravitational forces (or gravity-induced reaction forces). Movement of the portable electronic device 20 to alternate orientations is detected and the orientation of the accelerometer 41, and therefore of the portable electronic device 20, may be determined.

Some of the subsystems of the portable electronic device 20 perform communication-related functions, whereas other subsystems may provide "resident" or on-device functions. By way of example, the display 32 and the touch-sensitive overlay 34 may be used for both communication-related functions, such as entering a text message for transmission over the network 1000, and device-resident functions such as a calculator or task list.

The portable electronic device 20 may send and receive communication signals over the wireless network 1000 after network registration or activation procedures have been completed. Network access is associated with a subscriber or user of the portable electronic device 20. To identify a subscriber according to the present embodiment, the portable electronic device 20 uses a SIM/RUIM card 52 (i.e. Subscriber Identity Module or a Removable User Identity Module) inserted into a SIM/RUIM interface 54 for communication with a network such as the network 1000. The SIM/RUIM card 52 is one type of a conventional "smart card" that may be used to identify a subscriber of the portable electronic device 20 and to personalize the portable electronic device 20, among other things. In the present embodiment the portable electronic device 20 is not fully operational for communication with the wireless network 1000 without the SIM/RUIM card 52. By inserting the SIM/RUIM card 52 into the SIM/RUIM interface 54, a subscriber may access all subscribed services. Services may include: web browsing and messaging such as e-mail, voice mail, Short Message Service (SMS), and Multimedia Messaging Services (MMS). More advanced services may include: point of sale, field service and sales force automation. The SIM/RUIM card 52 includes a processor and memory for storing information. Once the SIM/RUIM card 52 is inserted into the SIM/RUIM interface 54, it is coupled to the processor 22. In order to identify the subscriber, the SIM/RUIM card 52 may include some user parameters such as an International Mobile Subscriber Identity (IMSI). An advantage of using the SIM/RUIM card 52 is that a subscriber is not necessarily bound by any single physical portable electronic device. The SIM/RUIM card 52 may store additional subscriber information for a portable electronic device as well, including datebook (or calendar) information and recent call information. Alternatively, user identification information may also be programmed into the flash memory 30.

The portable electronic device 20 is a battery-powered device and includes a battery interface 56 for receiving one or more rechargeable batteries 58. In at least some embodiments, the battery 58 may be a smart battery with an embedded microprocessor. The battery interface 56 is coupled to a regulator (not shown), which assists the battery 58 in providing power V+ to the portable electronic device 20. Although current technology makes use of a battery, future technologies such as micro fuel cells may provide the power to the portable electronic device 20.

The portable electronic device 20 also includes an operating system 60 and software components 62 which are described in more detail below. The operating system 60 and the software components 62 that are executed by the processor 22 are typically stored in a persistent store such as the flash memory 30, which may alternatively be a read-only memory (ROM) or similar non-transitory storage element (not shown). Those skilled in the art will appreciate that portions of the operating system 60 and the software components 62, such as specific software applications 64, 66, 68, 70 and 72, or parts thereof, may be temporarily loaded into a volatile store such as the RAM 28. Other software components may also be included, as is well known to those skilled in the art.

The subset of software components 62 that control basic device operations, including data and voice communication applications, will normally be installed on the portable electronic device 20 during manufacture of the portable electronic device 20. Other software applications include a message application 64 that may be any suitable software program that allows a user of the portable electronic device 20 to send and receive electronic messages. Various alternatives exist for the message application 64 as is well known to those skilled in the art. Messages that have been sent or received by the user are typically stored in the flash memory 30 of the portable electronic device 20 or some other suitable storage element in the portable electronic device 20. In at least some embodiments, some of the sent and received messages may be stored remotely from the device 20 such as in a data store of an associated host system that the portable electronic device 20 communicates with.

The software components 62 may further include a device state module 66, a Personal Information Manager (PIM) 68, and other suitable modules (not shown). The device state module 66 provides persistence, i.e. the device state module 66 ensures that important device data is stored in persistent memory, such as the flash memory 30, so that the data is not lost when the portable electronic device 20 is turned off or loses power.

The PIM 68 includes functionality for organizing and managing data items of interest to the user, such as, but not limited to, e-mail, contacts, calendar events, voice mails, appointments, and task items. The PIM 68 has the ability to send and receive data items via the wireless network 1000. PIM data items may be seamlessly integrated, synchronized, and updated via the wireless network 1000 with the portable electronic device subscriber's corresponding data items stored and/or associated with a host computer system. This functionality creates a mirrored host computer on the portable electronic device 20 with respect to such items. This may be particularly advantageous when the host computer system is the portable electronic device subscriber's office computer system.

The software components 62 also includes a connect module 70, and an information technology (IT) policy module 72. The connect module 70 implements the communication protocols that are required for the portable electronic device 20 to communicate with the wireless infrastructure and any host system, such as an enterprise system, that the portable electronic device 20 is authorized to interface with.

The connect module 70 includes a set of APIs that may be integrated with the portable electronic device 20 to allow the portable electronic device 20 to use any number of services associated with the enterprise system. The connect module 70 allows the portable electronic device 20 to establish an end-to-end secure, authenticated communication pipe with the host system. A subset of applications for which access is provided by the connect module 70 may be used to pass IT policy commands from the host system to the portable electronic device 20. This may be done in a wireless or wired manner. These instructions may then be passed to the IT policy module 72 to modify the configuration of the device 20. Alternatively, in some cases, the IT policy update may also be done over a wired connection.

Other types of software applications may also be installed on the portable electronic device 20. These software applications may be third party applications, which are added after the manufacture of the portable electronic device 20. Examples of third party applications include games, calculators, utilities, etc.

The additional applications may be loaded onto the portable electronic device 20 through at least one of the wireless network 1000, the auxiliary I/O subsystem 40, the data port 42, the short-range communications subsystem 48, or any other suitable device subsystem 50. This flexibility in application installation increases the functionality of the portable electronic device 20 and may provide enhanced on-device functions, communication-related functions, or both. For example, secure communication applications may enable electronic commerce functions and other such financial transactions to be performed using the portable electronic device 20.

The data port 42 enables a subscriber to set preferences through an external device or software application and extends the capabilities of the portable electronic device 20 by providing for information or software downloads to the portable electronic device 20 other than through a wireless communication network. The alternate download path may, for example, be used to load an encryption key onto the portable electronic device 20 through a direct and thus reliable and trusted connection to provide secure device communication.

The data port 42 may be any suitable port that enables data communication between the portable electronic device 20 and another computing device. The data port 42 may be a serial or a parallel port. In some instances, the data port 42 may be a USB port that includes data lines for data transfer and a supply line that may provide a charging current to charge the battery 58 of the portable electronic device 20.

The short-range communications subsystem 48 provides for communication between the portable electronic device 20 and different systems or devices, without the use of the wireless network 1000. For example, the short-range communications subsystem 48 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download is processed by the communication subsystem 24 and input to the processor 22. The processor 22 then processes the received signal for output to the display 32 or alternatively to the auxiliary I/O subsystem 40. A subscriber may also compose data items, such as e-mail messages, for example, using the touch-sensitive overlay 34 on the display 32 that are part of the touch-sensitive input assembly 38, and possibly the auxiliary I/O subsystem 40. The auxiliary subsystem 40 may include devices such as: a mouse, track ball, infrared fingerprint detector, or a roller wheel with dynamic button pressing capability. A composed item may be transmitted over the wireless network 1000 through the communication subsystem 24.

For voice communications, the overall operation of the portable electronic device 20 is substantially similar, except that the received signals may be output to the speaker 44, and signals for transmission are generated by the microphone 46. Alternative voice or audio I/O subsystems, such as a voice message recording subsystem, may also be implemented on the portable electronic device 20. Although voice or audio signal output may be accomplished through the speaker 44, the touch-sensitive input assembly 38 may also be used to provide audio output, for example, for speakerphone or ringer functions.

Figure 2:
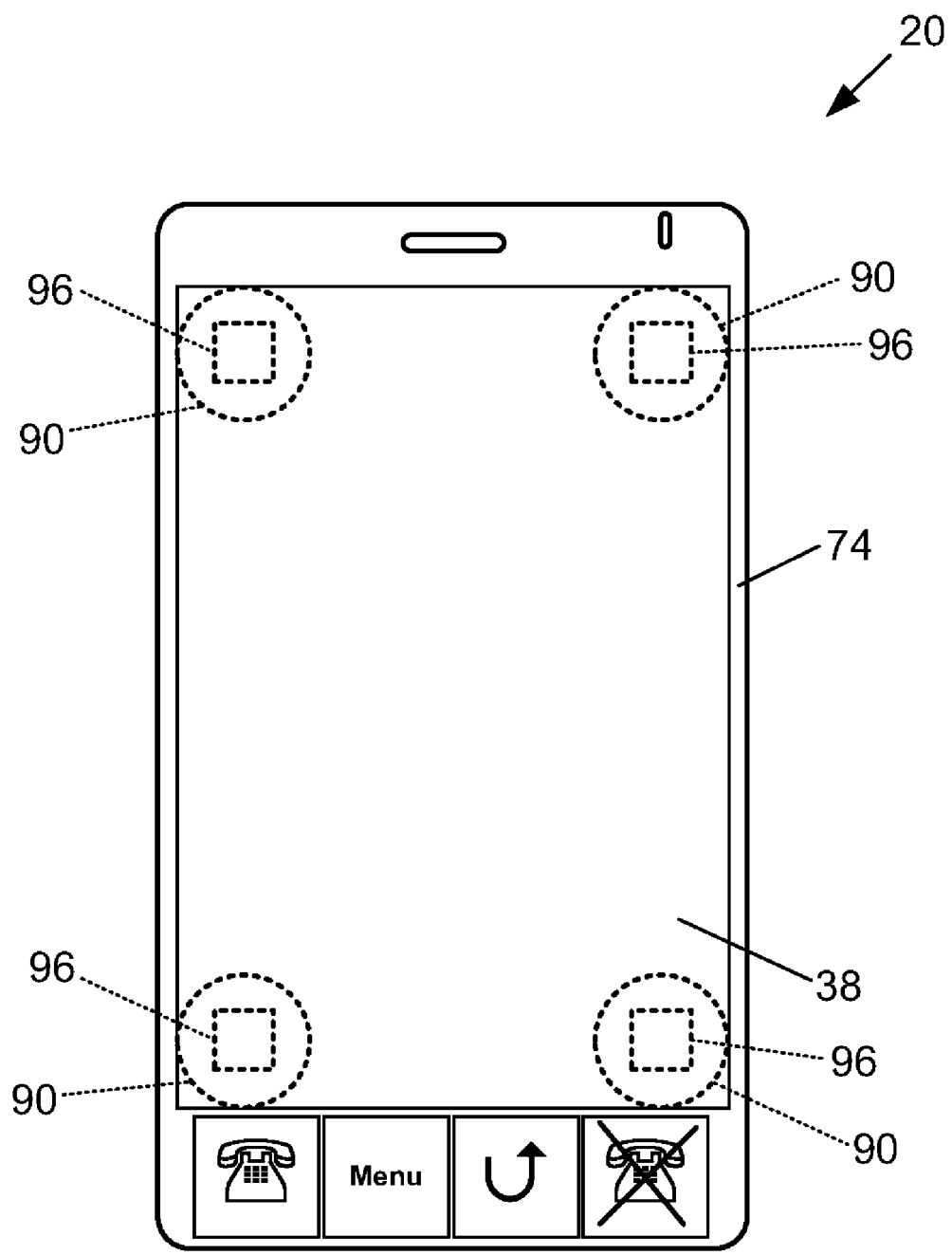
FIG. 2 is a front view of an example of a portable electronic device in a portrait orientation.

Reference is made to the FIG. 2 which shows a front view of an example of a portable electronic device 20 in portrait orientation. The portable electronic device 20 includes a housing 74 that houses the internal components that are shown in FIG. 1 and frames the touch-sensitive input assembly 38 such that the touch-sensitive input assembly 38 is exposed for user-interaction therewith when the portable electronic device 20 is in use. It will be appreciated that the touch-sensitive input assembly 38 may include any suitable number of user-selectable features rendered thereon, for example, in the form of virtual buttons for user-selection of, for example, applications, options, or keys of a keyboard for user entry of data during operation of the portable electronic device 20.

The touch-sensitive input assembly 38 may be, for example, a capacitive touch-sensitive display that includes the display 32 and the touch-sensitive overlay 34. A capacitive touch-sensitive overlay 34 includes a number of layers in a stack and is fixed to the display 32 via a suitable optically clear adhesive. The layers may include, for example a substrate fixed to the LCD display 32 by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers may be any suitable material such as patterned indium tin oxide (ITO).

In the present example, the X and Y location of a touch event are both determined with the X location determined by a signal generated as a result of capacitive coupling with one of the touch sensor layers and the Y location determined by the signal generated as a result of capacitive coupling with the other of the touch sensor layers. Each of the touch-sensor layers provides a signal to the controller 36 as a result of capacitive coupling with a suitable object such as a finger of a user resulting in a change in the electric field of each of the touch sensor layers. The signals represent the respective X and Y touch location values. It will be appreciated that other attributes of the user's touch on the touch-sensitive input assembly 38 may be determined. For example, the size and the shape of the touch on the touch-sensitive input assembly 38 may be determined in addition to the location (X and Y values) based on the signals received at the controller 36 from the touch sensor layers.

A user's touch on the touch-sensitive input assembly 38 is determined by determining the X and Y touch location and user-selected input is determined based on the X and Y touch location and the application executed by the processor 22. Thus a feature such as a virtual button displayed on the touch-sensitive input assembly 38 may be selected by matching the feature to the X and Y location of a touch event on the touch-sensitive input assembly 38. A feature that is selected by the user is determined based on the X and Y touch location and the application.

Figure 3A:
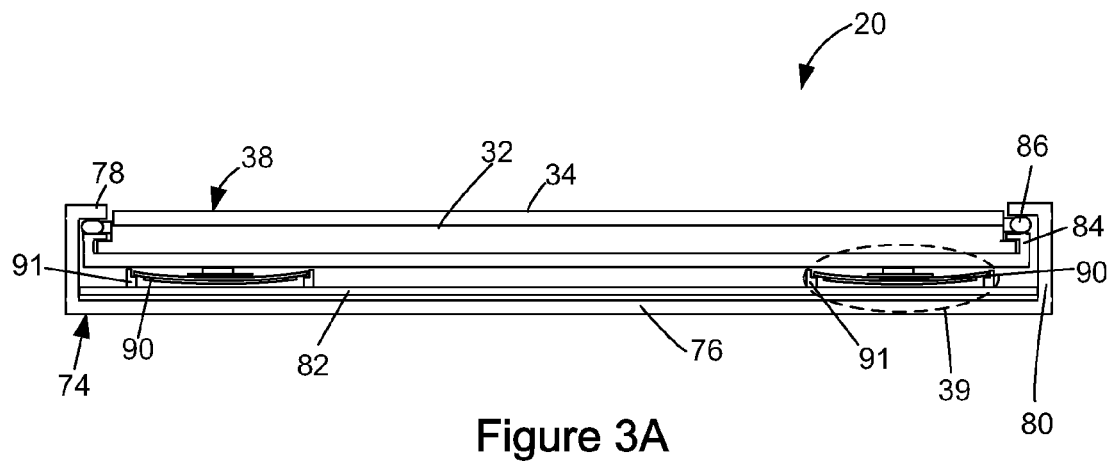
FIG. 3A is a sectional side view of portions of the touch-sensitive input assembly of FIG. 2.
Figure 3B:
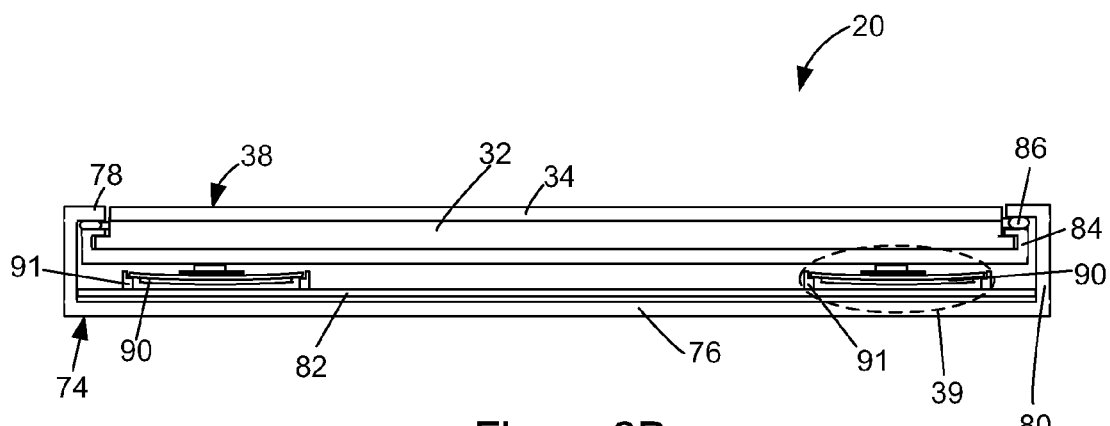
FIG. 3B is a sectional side view of portions of the touch-sensitive input assembly of FIG. 2.

The housing 74 may be any suitable housing for the internal components shown in FIG. 1 and for sealing with and facilitating movement of the touch-sensitive input assembly 38. As best shown in FIGS. 3A and 3B, the housing 74 in the present example includes a back 76, a frame 78, which frames the touch-sensitive input assembly 38 and sidewalls 80 that extend between and generally perpendicular to the back 76 and the frame 78. A base 82 is spaced from and is generally parallel to the back 76. The base 82 may be any suitable base and may include, for example, a printed circuit board or flex circuit board supported by a stiff support between the base 82 and the back 76. The back 76 includes a plate (not shown) that is releasably attached for insertion and removal of, for example, the battery 58 and the SIM/RUIM card 52 described above. It will be appreciated that the back 76, the sidewalls 80 and the frame 78 may be injection molded, for example. In the example of the portable electronic device 20 shown in FIG. 2, the frame 78 is generally rectangular with rounded corners although other shapes are possible.

The display 32 and the touch-sensitive overlay 34 may be supported on a support tray 84 of suitable material such as magnesium for providing mechanical support to the display 32 and touch-sensitive overlay 34. A compliant gasket 86 may be located around the perimeter of the frame 78, between an upper portion of the support tray 84 and the frame 78 to provide a seal for protecting the components housed in the housing 74 of the portable electronic device 20 against liquid ingress or foreign material such as sand, dust and lint. A suitable material for the compliant gasket 86 includes, for example, a silicone rubber for providing a seal between the touch-sensitive input assembly and the housing 74, for shock absorption, vibration damping and suitable fatigue life. Thus, the touch-sensitive input assembly 38 is sealed against the housing 74 to provide a sealed volume of space within the housing 74. The touch-sensitive input assembly 38 is also moveable within the housing 74 as the touch-sensitive input assembly 38 may be moved away from the base 82, thereby compressing the compliant gasket 86, for example and may be moved toward the base 82, thereby compressing shock-absorbing elements 88 referred to below. FIGS. 3A and 3B show exaggerated movement of the touch-sensitive input assembly 38 with FIG. 3A showing the touch-sensitive input assembly 38 moved toward the base 82 and with FIG. 3B showing the touch-sensitive input assembly 38 with the actuating arrangement 39 actuated to push the touch-sensitive input assembly 38 away from the base 82. The compliant gasket 86 also acts as a speaker spider for providing a restoring force, or spring, so that the touch-sensitive input assembly 38 returns to the rest position after being moved by the actuating arrangement 39 in response to an input signal.

Figure 3C:
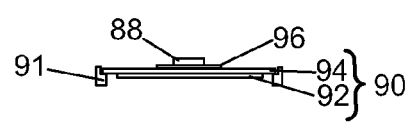
FIG. 3C is a side view of a portion of the portable electronic device of FIG. 2 according to one embodiment.

In the present example, the actuating arrangement 39 includes four piezoelectric actuators 90, with each piezoelectric actuator 90 supported on a respective support ring 91. Each support ring 91 extends from the base 82 toward the touch-sensitive input assembly 38 for supporting the respective piezoelectric actuator 90 while permitting flexing of the piezoelectric actuator 90. As best shown in FIG. 3C, each piezoelectric actuator 90 includes a piezoelectric disk 92 such as a PZT ceramic disk adhered to a metal substrate 94 of larger diameter than the piezoelectric disk 92 for bending when the piezoelectric disk 92 contracts as a result of build up of charge at the piezoelectric disk 92. Each piezoelectric actuator 90 is supported on the respective support ring 91 on one side of the base 82, proximal a respective corner of the housing 74 with the metal ring sized such that the edge of the metal substrate 94 contacts the support ring 91 for supporting the piezoelectric actuator 90 and permitting flexing of the piezoelectric actuator 90. A plunger 88, which in the present example is a cylinder of suitable material such as a hard rubber for mechanical coupling between the piezoelectric actuator 90 and the touch-sensitive input assembly 38. Hard rubber is a suitable material to reduce chattering during rapid movement. The plunger 88 is located between the piezoelectric actuator 90 and the support tray 84 and may be adhered to the support tray 84 for applying forces thereto. A respective force sensor 96 is located between each shock-absorbing element 88 and the respective piezoelectric actuator 90 and each respective force sensor 96 is adhered to both the respective plunger 88 and the respective piezoelectric actuator 90. A suitable force sensor 96 includes, for example, a puck-shaped force sensing resistor for measuring applied force (or pressure). It will be appreciated that a force may be determined using a force sensing resistor as an increase in pressure on the force sensing resistor results in a decrease in resistance (or increase in conductance). In the portable electronic device 20, each piezoelectric actuator 90 is located between the base 82 and the support tray 84 and force is applied on each piezoelectric actuator 90 by the touch-sensitive input assembly 38, in the direction of the base 82, causing bending of the piezoelectric actuator 90. Thus, absent an external force applied by the user, for example by pressing on the touch-sensitive input assembly 38, and absent a charge on the piezoelectric actuator 90, the piezoelectric actuator 90 undergoes slight bending. An external applied force in the form of a user pressing on the touch-sensitive input assembly 38 during a touch event, and without actuation of the piezoelectric actuator 90, causes increased bending of the piezoelectric actuator 90, as shown in FIG. 3A and the piezoelectric actuator 90 applies a spring force against the touch-sensitive input assembly 38. Alternatively, a reverse charge on the piezoelectric actuator 90 may result in further bending of the piezoelectric actuator 90 as shown in FIG. 3A. When the piezoelectric disk 92 is charged, the piezoelectric disk 92 shrinks and causes the metal substrate 94 and piezoelectric disk 92 to apply a further force on the touch-sensitive input assembly 38 as the piezoelectric actuator 90 straightens, as shown in FIG. 3B.

The support rings 91 may be part of the base 82 or may be supported on the base 82. Each piezoelectric actuator 90 is located between the base 82 and the support tray 84 such that an external applied force on the touch-sensitive input assembly 38 resulting from a user pressing the touch-sensitive input assembly 38 may be measured by the force sensors 96 and such that the charging of the piezoelectric actuator 90 results in an applied force on the touch-sensitive input assembly 38 to cause movement of the touch-sensitive input assembly 38, away from the base 82.

In the present embodiment each piezoelectric actuator 90 is in contact with the support tray 84. Thus, depression of the touch-sensitive input assembly 38 by user application of a force thereto is determined by a change in resistance at the force sensors 96 and causes further bending of the piezoelectric actuators 90 as shown in FIG. 3A. Further, the charge on the piezoelectric actuator 90 may be modulated to control the force applied by the piezoelectric actuator 90 on the support tray 84 and the resulting movement of the touch-sensitive input assembly 38. The charge may be modulated by modulating the applied voltage or current. For example, a current may be applied to increase the charge on the piezoelectric actuator 90 to contract the piezoelectric disk 92 as described above, causing the metal substrate 94 and the piezoelectric disk 92 to straighten as referred to above. This charge therefore results in the force on the touch-sensitive input assembly 38 for moving the touch-sensitive input assembly 38 away from the base 82, as shown in FIG. 3B. The charge on the piezoelectric actuator 90 may also be removed via a controlled discharge current causing the piezoelectric disk 92 to expand again, releasing the force caused by the electric charge and thereby decreasing the force on the touch-sensitive input assembly 38, facilitating movement of the touch-sensitive input assembly 38 to return to a rest position. The movement of the touch-sensitive input assembly 38 and the flexing of the piezoelectric actuators 90 is exaggerated in FIGS. 3A and 3B for the purpose of illustration.

Figure 4:
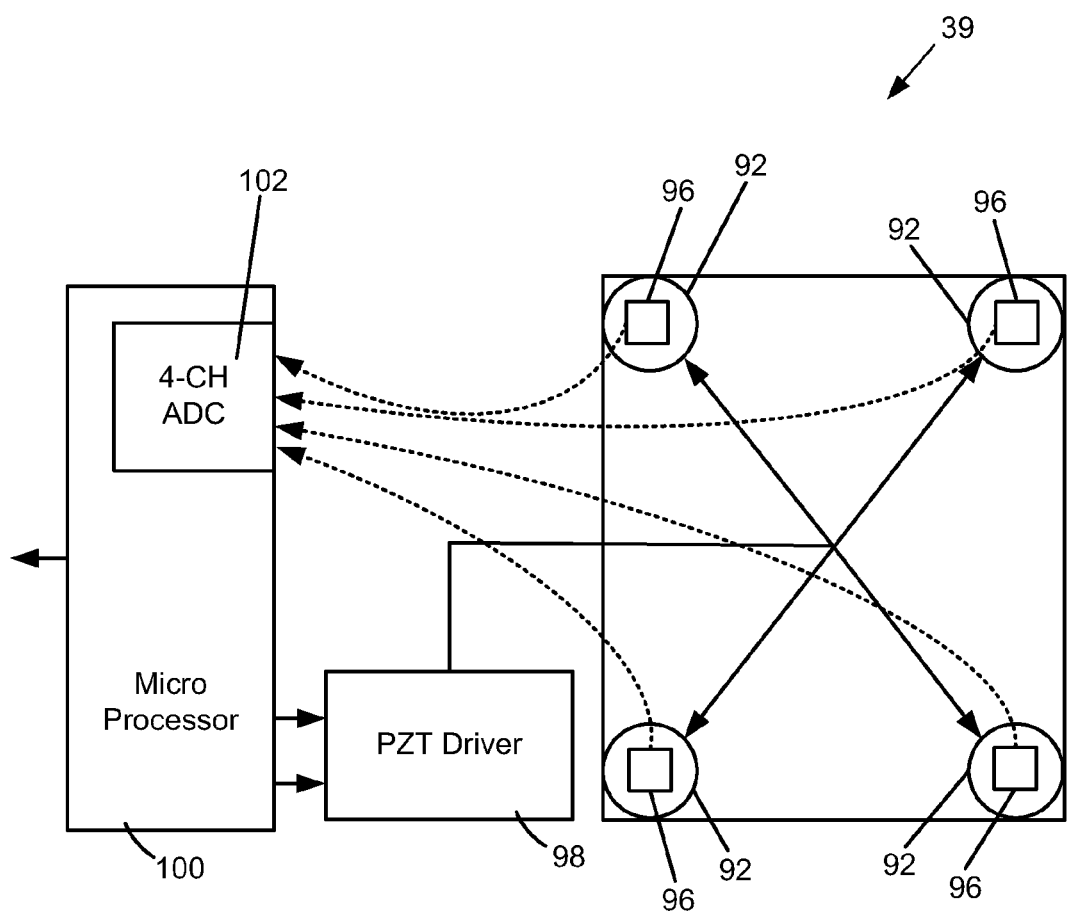
FIG. 4 is a functional block diagram of an actuating arrangement of the portable electronic device.

FIG. 4 shows the actuating arrangement 39 according to one embodiment. As shown, each of the piezoelectric disks 92 is connected to a piezo driver 98 that communicates with a microprocessor 100 including a four-channel amplifier and analog-to-digital converter 102 that is connected to each of the force sensors 96. The microprocessor 100 is also in communication with the main processor 22 of the portable electronic device 20. The microprocessor 100 may provide signals to the main processor 22 and may receive signals form the main processor 22. It will be appreciated that the piezo driver 98 may be embodied in drive circuitry between the microprocessor 100 and the piezoelectric disks 92.

The mechanical work performed by the piezoelectric actuator 90 may be controlled to provide generally consistent force and movement of the touch-sensitive input assembly 38 in response to detection of an applied force on the touch-sensitive input assembly 38 in the form of a touch, for example, and may provide movement of the touch-sensitive input assembly 38 to produce sound. Fluctuations in mechanical work performed as a result of, for example, temperature, may be reduced by modulating the current to control the charge. Those skilled in the art will appreciate that each piezoelectric disk 92 has similar electrical properties to a capacitor. The mechanical work performed (force*displacement) by the peizo disk actuator 90 may be controlled by controlling the charge, expressed as:

$$Q_{piezo} = C_{piezo} * V_{piezo}$$

where: Q is charge;
C is capacitance; and
V is voltage.

A coefficient, referred to as the D31 coefficient of a piezoelectric material composition provides the relationship between voltage and force. The D31 coefficient and the relative dielectric constant, (Er) of a given piezoelectric material composition vary inversely with temperature, however. Therefore, if the charge of the piezoelectric disk 92 is controlled within a small range, the variance of the mechanical work of the piezoelectric actuator 90 may be small. The current may be controlled as the current flowing in or out of a capacitor (which has similar electrical properties to the piezoelectric disk 92) is given by:

$$I = C * dV/dT$$

where I is current;
C is capacitance; and
dV/dT is differential voltage or instantaneous rate of voltage change.

With I and dT held constant, then as C decreases, dV increases. Thus the charge is controlled since $Q_{piezo} = C_{piezo} * V_{piezo}$.

The microprocessor 100 controls the PZT driver 98 for controlling the current to the piezoelectric disks 92 and thereby controlling the charge, increasing the charge to increase the force on the touch-sensitive input assembly 38 away from the base 82 and decreasing the charge to decrease the force on the touch-sensitive input assembly 38, causing the touch-sensitive input assembly 38 to move toward the base 82. In the present example, each of the piezoelectric actuators 90 are connected to the microprocessor 100 through the piezo driver 98 and are all controlled equally and concurrently.

The portable electronic device 20 is controlled generally by monitoring the orientation of the electronic device 20 based on signals from the accelerometer 41 and adjusting the driving signals to the piezoelectric disks 92 to control movement of the touch-sensitive input assembly 38 relative to the base 82 and thereby control sound generated from the movement.

It will be appreciated that typical speakers used in portable electronic devices are made with light weight paper or mylar cones and therefore their position within the speaker frame relative to the base of the speaker is relatively unaffected by the force of gravity, even with a compliant spider. In the portable electronic device 20 according to the present embodiment, the position of the touch-sensitive input arrangement 38 is affected by the force of gravity as the touch-sensitive input assembly 38 is much heavier relative to light weight paper or mylar. The material for the compliant gasket 86 may be optimized for the performance of the tactile feedback rather than as a spider in an audio transducer. The orientation of the portable device therefore has a substantial effect on the resting position of the touch-sensitive input arrangement 38 (speaker cone), which in this embodiment is the touch-sensitive input assembly 38.

It will be understood by those of ordinary skill in the art that when an audio signal is limited either asymmetrically or symmetrically, distortion is heard by the listener and is generally undesirable. Therefore, it is desirable to facilitate movement of the touch-sensitive input assembly 38 and inhibit limiting the movement of the touch-sensitive input assembly 38 when it is controlled by the actuating arrangement 39 in providing audio sound output.

The portable electronic device 20 may be designed such that when in an upright position, with the touch-sensitive input assembly 38 held vertically such that the touch-sensitive overlay 34 is generally parallel with a vertical plane, the touch-sensitive input assembly 38 moves relatively freely in equal distances both towards and away from base 82. In this orientation, when an electrical signal in the form of a sine wave that is voltage symmetrical is applied to the actuating arrangement 39, full physical motion of touch-sensitive input assembly 38 may be achieved. If the portable device is rotated into a horizontal position, in which the touch-sensitive overlay is held generally perpendicular to the vertical plane, the touch-sensitive input assembly 38 may be pushed down towards the base 82 as a result of gravity. In this orientation, the movement of the touch-sensitive input assembly 38 may be limited by a mechanical stop that is formed by plunger 88 and support ring 91. In order to compensate for this, an offset voltage is applied to the electrical signal provided to the piezo actuators. This offset voltage counters the affect of gravity and re-positions the touch-sensitive input assembly 38 back to its natural rest position to facilitate full movement of the touch-sensitive input assembly 38.

A similar condition is encountered when the portable device is an orientation in which the touch-sensitive input assembly 38 is facing down and the force of gravity is pushing touch-sensitive input assembly 38 away from base 82. It will be appreciated that in this orientation, the compliant gasket 82 is compressed and reaches a position in which its spring constant is non-linear and may physically limit the movement of the touch-sensitive input assembly 38 in the direction away from the base. To compensate for the affect of gravity, an offset voltage is applied to the actuating arrangement 39 to re-position the touch-sensitive input assembly 38 back to its natural rest position to facilitate full movement of the touch-sensitive input assembly 38. Orientation is determined using the information provided by accelerometer 41.

It will also be appreciated that a portable handheld device may be subject to random movement when carried by a user, for example. In order to compensate for the effects of gravity, the orientation is constantly monitored using information provided by accelerometer 41. Using this information, the electrical signal applied to the actuating arrangement 39 may be modified accordingly to facilitate full movement of the touch-sensitive input assembly 38.

To apply the offset voltage, an extra margin for the electrical drive of the piezo actuators both in terms of the output transistors and in terms of the recommended operating voltage of the piezo actuators may be employed.

Figure 5:
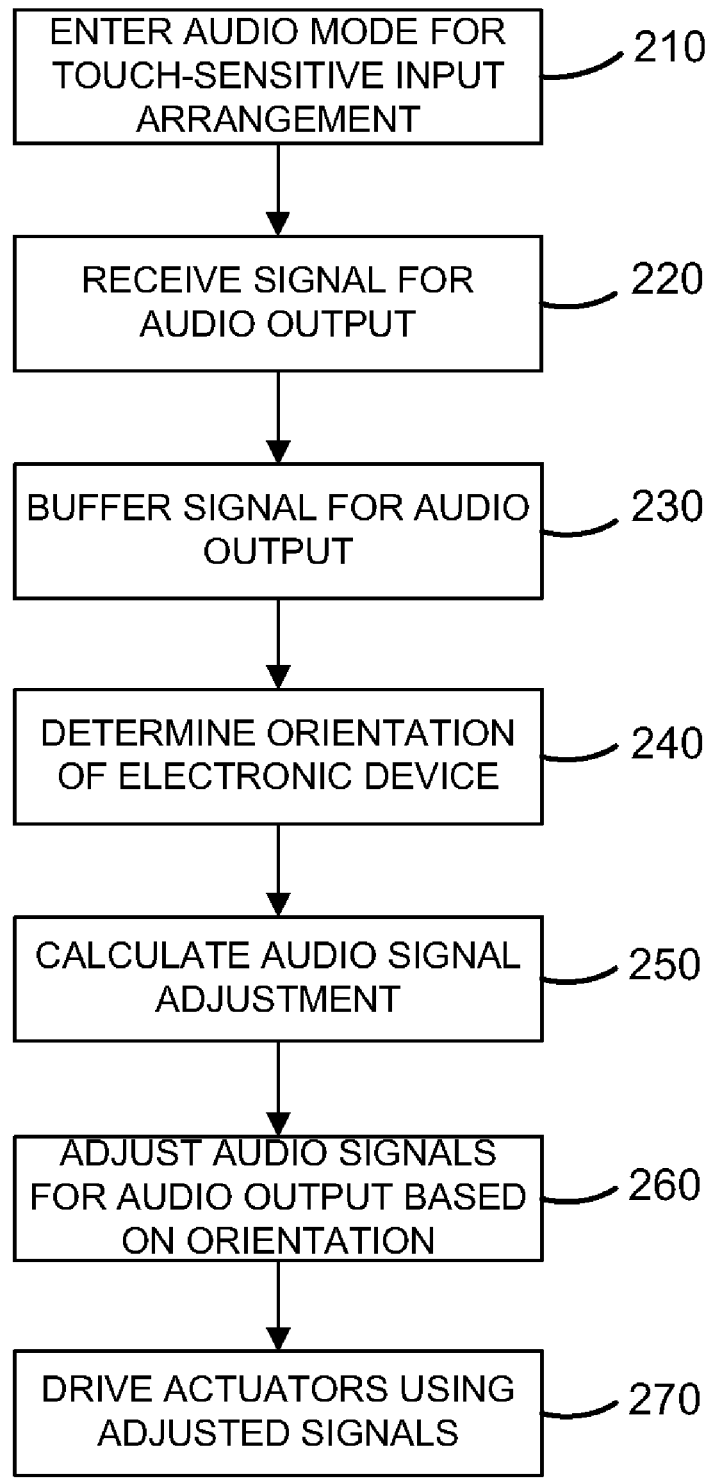
FIG. 5 is a flow-chart illustrating a method of controlling a portable electronic device according to an embodiment.

Reference is made to FIG. 5 to describe a method of controlling a portable electronic device in accordance with one embodiment. It will be appreciated that the steps of FIG. 5 may be carried out by routines or subroutines of software executed by, for example, the processor 22. Coding of software for carrying out such steps is well within the scope of a person of ordinary skill in the art having regard to the present description.

The method starts with the portable electronic device 20 entering a mode in which the touch-sensitive input arrangement 38 is used for audio output, for example, in a ringer mode upon receipt of an incoming call or a speakerphone mode during a telephone call (step 210). The audio signal is received at the portable electronic device 20 (step 220). In the present embodiment, the audio signal is a voice communication that is received at the portable electronic device 20 for output using the touch-sensitive input arrangement 38. The audio signal is buffered, for example, in the RAM 28, temporarily storing the signals prior to outputting to the piezoelectric actuators 90 (step 230). The orientation of the electronic device is determined based on signals from the accelerometer (step 240) and the adjustment for the audio signal is determined based on the orientation of the portable electronic device 20 (step 250). The adjustment is dependent on the mass of the touch-sensitive input arrangement 38, the orientation or angle that the portable electronic device 20, and thus the position that the touch-sensitive input arrangement 38, is held at during audio output. The adjustment is based on the component of the force of gravity on the touch-sensitive input assembly 38 that acts to bend the piezoelectric actuators 90 between the base 82 and the touch-sensitive input arrangement 38. When, for example, the portable electronic device 20 is held horizontally, with the touch-sensitive overlay 34 generally perpendicular to the vertical plane, the component of the force of gravity is 100% and the resulting adjustment is greater compared to the adjustment when the portable electronic device is held at some other angle to the ground. The audio signal adjustment is therefore determined based on the determined orientation (step 250) and the buffered audio signals are adjusted accordingly to provide drive signals for the piezoelectric actuators 90 (step 260). The drive signals are then sent to the piezoelectric actuators 90 for movement of the touch-sensitive input arrangement 38 to generate sound (step 270).

In the above described example, the audio signal is a voice communication that is received at the portable electronic device 20. Alternatively, the audio signal may be memory for a ring or for vibratory notification. When the audio signal is received from memory, buffering may not occur as the audio is sampled out from the memory.

The audio signals are thereby adjusted based on the orientation of the portable electronic device 20 and based on the mass of the touch-sensitive input arrangement 38 to counteract the effect of the component of gravity on the touch-sensitive input arrangement 38 that acts on the piezoelectric actuators 90. The audio signals are therefore pre-distorted to provide an audio output that is close to the desired output.

Figure 6:
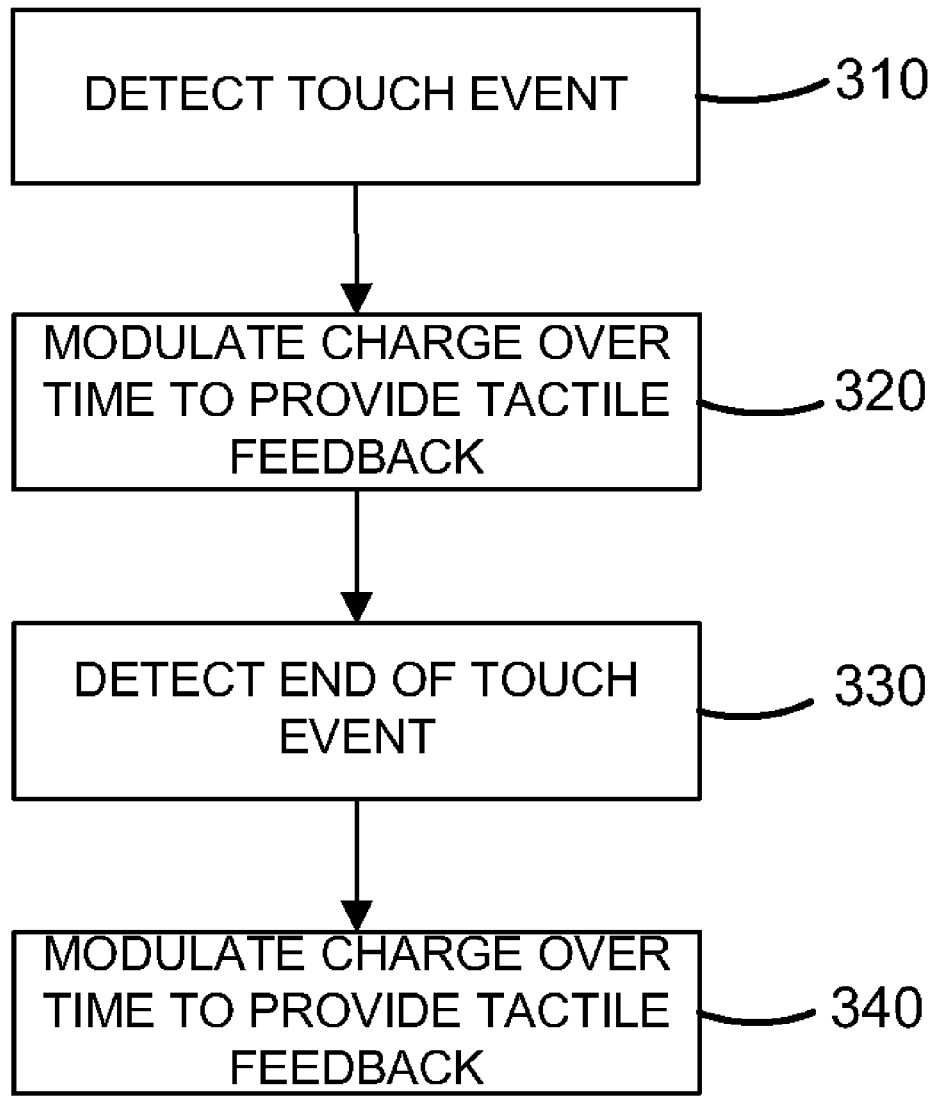
FIG. 6 is a flow chart illustrating another method of controlling the portable electronic device according to an embodiment.

In addition to providing audio output, the piezoelectric actuators 90 may also be used to provide tactile feedback when a touch event is detected. FIG. 6 is a flow chart illustrating a method of controlling the portable electronic device 20 to provide tactile feedback. It will be appreciated that the flow chart of FIG. 6 is simplified for the purpose of explanation. It will be appreciated that the steps of FIG. 6 may be carried out by routines or subroutines of software executed by, for example, the processor 22 or the microprocessor 100. Coding of software for carrying out such steps is well within the scope of a person of ordinary skill in the art having regard to the present description.

When the portable electronic device 20 turned to an on or awake state, the touch-sensitive input assembly 38 is monitored for a touch event and, in response to determination of a touch event (step 310), the charge at each of the piezoelectric disks 92 is modulated to modulate the force applied by the piezoelectric actuator 90 on the touch-sensitive input assembly 38 to cause movement of the touch-sensitive input assembly 38 for simulating the collapse of a dome-type switch (step 320). When the end of the touch event is detected (step 330), the charge at each of the piezoelectric disks 92 is modulated to modulate the force applied by the piezoelectric actuators 90 to the touch-sensitive input assembly 38 to cause movement of the touch-sensitive input assembly 38 for simulating release of a dome-type switch (step 340).

It will be appreciated that the flow chart of FIG. 6 is simplified for the purpose of explanation. A further touch event may be detected again and the steps may be repeated, for example. Further, more than one touch event may occur such that a second touch event may be detected prior to the end of a first touch event. Thus, the charge at each of the piezoelectric disks 92 may be modulated again to modulate the force applied by the piezoelectric actuators 90 to the touch-sensitive input assembly 38 to cause movement of the touch-sensitive input assembly 38 for simulating another collapse of a dome-type switch prior to the end of the first touch event being detected.

Continued reference is made to FIG. 6 to describe an example of the method of controlling a portable electronic device in accordance with the present embodiment. A force on the touch-sensitive input assembly 38 is detected through the force sensors 96, as a result of a change in resistance at the force sensitive resistors. The force is determined at the microprocessor 100 as a result of signals from the amplifier and four-channel analog to digital converter 102 connected to each of the force sensors 96. Thus, the touch-sensitive input assembly 38 is monitored for a touch event and a touch event on the touch-sensitive input assembly 38 may be detected. Such a touch event may be determined upon determination of an external applied force as a result of a user touch at the touch-sensitive input assembly 38 for selection of, for example, an Internet browser application, an email application, a calendar application, or any other suitable application, option, or other feature within an application (step 310). For the purpose of the present example, the touch event is detected when the force measured at the force sensors 96 exceeds a minimum threshold force. Thus, the measured force at the force sensors 96 is compared to a threshold force and a touch event is detected if the measured force is determined to exceed the threshold force. Conversely, a touch event is not detected as a result of a relatively light touch or brush on the touch-sensitive input assembly 38 with a measured force that is lower than the threshold force. It will be appreciated that the touch-sensitive input surface 34 is thereby monitored for a touch event.

In response to detection of the touch event at step 310, a suitable current is applied to the piezoelectric actuator 90, ramping up the charge over a period of time causing flexing of the piezoelectric actuator 90 and a resulting force applied to the touch-sensitive input assembly 38 through the support tray 84. The charge is ramped up over a period of time so that the user does not detect the force applied by the piezoelectric actuators 90 on the touch-sensitive input assembly 38. Next, the electrical charge is reduced by a suitable controlled discharge current and the resulting force applied by the piezoelectric actuator 90 on the touch-sensitive input assembly 38 is reduced over a very short period of time relative to the period of time for ramping up the charge, for simulating collapse of a dome-type switch (step 320).

Next, the end of the touch event is detected (step 330). When the measured force at the force sensors is reduced to a force below a predetermined force, the end of the touch event is detected. The predetermined force may be lower than the threshold force described above for reducing the chance of false detection of an end of a touch event and successive start of another touch event if the external applied force hovers such that the measured force hovers at about the threshold applied force. A suitable current is applied to the piezoelectric actuator 90, causing an increase in charge, flexing of the piezoelectric actuator 90 and a resulting force to be applied to the touch-sensitive input assembly 38 through the support tray 84 over a relatively short period of time compared to the period of time for ramping up the charge, for simulating release of a dome-type switch (step 340). Next, the electrical charge is reduced and the resulting force applied by the piezoelectric actuator 90 on the touch-sensitive input assembly 38 is reduced by ramping down over a long period of time compared to the period of time for increasing charge to simulate release.

The charge and/or discharge current applied to the piezoelectric disk 92 is therefore modulated to modulate the force from the piezoelectric actuators 90 on the touch-sensitive input assembly 38 for providing a desirable tactile feedback by simulating collapse of a dome-type switch in response to detection of the touch event and by simulating release of a dome-type switch upon detection of an end of the touch event.

In other embodiments, rather than piezoelectric disks, a piezoelectric patch transducer or multiple piezoelectric patch transducers may be used. In still other embodiments, an electrostrictive material may be used rather than a piezoelectric material. A magnetostrictive material may also be employed. Similarly, an electroactive polymer may be used rather than a piezo actuator.

The actuating arrangement provides a relatively thin device for providing audio output as well as tactile feedback to the user without adding significantly to the thickness of the device. The piezoelectric actuators are driven to cause movement of the touch-sensitive input arrangement and thereby produce sound rather than using an additional speaker. Audio signals are adjusted to compensate for the effects of gravity on the touch-sensitive input arrangement. Thus, a touch-sensitive display device, for example, may be used as an audio transducer in a speakerphone or ringer, thereby saving the cost of the speaker used for such functions and the volume of space of such a speaker and air cavity within the electronic device.

An electronic device includes a housing including a base, a touch-sensitive input assembly coupled to the housing and spaced from and moveable relative to the base to generate sound, an accelerometer housed within the housing, an actuating arrangement comprising a piezoelectric actuator between the base and the touch-sensitive input surface and arranged to receive a driving signal and move the touch-sensitive input surface relative to the base, and functional components in the housing comprising a memory and a processor operably coupled to the memory, the touch-sensitive input assembly, the actuating arrangement, and the accelerometer to execute a program stored in the memory to determine an orientation of the electronic device and adjust the driving signal to the actuating arrangement based on the orientation of the electronic device.

A method of controlling the electronic device includes determining an orientation of the electronic device and adjusting the driving signal to the actuating arrangement based on the orientation of the electronic device.

A computer-readable medium has computer-readable code embodied therein for execution by a processor in the electronic device to cause the electronic device to determine an orientation of the electronic device, and adjust the driving signal to the actuating arrangement based on the orientation of the electronic device.

Advantageously, the piezoelectric actuators are driven to cause movement of the touch-sensitive input arrangement and thereby produce sound rather than, or in addition to, using an additional speaker. Audio signals are adjusted to compensate for the effects of gravity on the touch-sensitive input arrangement, that may distort or alter the sound depending on the orientation of the electronic device. Thus, a touch-sensitive display, for example, may be used as an audio transducer in a speakerphone or ringer, thereby saving the cost of the speaker used for such functions and the volume of space of such a speaker and air cavity within the electronic device. Further, the touch-sensitive display may provide more sound pressure level, extended frequency response and/or enhanced special effects when used with a speaker. The actuating arrangement also provides desirable tactile feedback in response to a touch event on the touch-sensitive display. Controlling the piezoelectric actuator or actuators to simulate actuation of a dome-type switch upon touching the touch-sensitive input surface provides a desirable tactile feedback for confirming receipt of input to the user, thereby providing a positive response and reducing the chance of input errors such as double entry, decreasing use time and increasing user-satisfaction. Additionally, the actuating arrangement acting on the touch-sensitive input arrangement may provide vibratory response or notification.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

What is claimed is:

1. An electronic device comprising:
   a housing including a base;
   a touch-sensitive input assembly coupled to the housing and spaced from and moveable relative to the base to generate sound;
   an accelerometer housed within the housing;
   an actuating arrangement comprising a piezoelectric actuator between the base and the touch-sensitive input surface and arranged to receive a driving signal and move the touch-sensitive input surface relative to the base; and
   functional components in the housing comprising a memory and a processor operably coupled to the memory, the touch-sensitive input assembly, the actuating arrangement, and the accelerometer to execute a program stored in the memory to determine an orientation of the electronic device and adjust the driving signal to the actuating arrangement based on the orientation of the electronic device to counter-act the effect of gravity on the touch-sensitive input assembly.

2. The electronic device according to claim 1, comprising a sealing element arranged between the touch-sensitive input assembly and the housing to substantially seal the touch-sensitive input assembly against the housing.

3. The electronic device according to claim 2, wherein the sealing element comprises a flexible, resilient sealing element.

4. The electronic device according to claim 1, wherein the piezoelectric actuator is adhered to the touch-sensitive input assembly.

5. The electronic device according to claim 1, wherein the actuating arrangement comprises a plurality of piezoelectric actuators between the base and the touch-sensitive input surface, each of the piezoelectric actuators arranged to receive a driving signal and move the touch-sensitive input surface relative to the base.

6. The electronic device according to claim 1, wherein the piezoelectric actuator comprises a piezoelectric disk actuator.

7. The electronic device according to claim 1, wherein the memory further includes a program executable by the processor to cause the actuating arrangement to modulate a force on the touch-sensitive input assembly and thereby cause movement of the touch-sensitive input assembly in response to detection of a touch thereon.

8. The electronic device according to claim 7, wherein modulation of the force comprises reducing the force over a collapse time period to cause the touch-sensitive input assembly to move toward the base and thereby simulate collapse of a dome-type switch.

9. The electronic device according to claim 8, wherein modulation of the force comprises increasing the force on the touch-sensitive input assembly, in a direction away from the base, over a ramp-up time period prior to reducing the force over the collapse time period.

10. The electronic device according to claim 9, wherein the ramp-up time period of time is longer than the collapse time period.

11. The electronic device according to claim 8, wherein modulation of the force comprises increasing the force over a release time period to cause the touch-sensitive input assembly to move away from the base and thereby simulate release of the dome-type switch.

12. The electronic device according to claim 1, wherein the touch-sensitive input assembly comprises a touch-sensitive input device disposed on a display.

13. The electronic device according to claim 1, wherein adjusting the driving signal comprises applying a pre-distortion to the driving signal to adjust the sound generated by the movement of the touch-sensitive input assembly.

14. A method of controlling an electronic device comprising a housing including a base, a touch-sensitive input assembly coupled to the housing and spaced from and moveable relative to the base to generate sound, an accelerometer housed within the housing, an actuating arrangement comprising a piezoelectric actuator between the base and the touch-sensitive input surface and arranged to receive a driving signal and move the touch-sensitive input surface relative to the base, and functional components in the housing comprising a memory and a processor operably coupled to the memory, the touch-sensitive input assembly, the actuating arrangement, and the accelerometer to execute a program stored in the memory, the method comprising:
    determining an orientation of the electronic device; and
    adjusting the driving signal to the actuating arrangement based on the orientation of the electronic device to counter-act the effect of gravity on the touch-sensitive input assembly.

15. A non-transitory computer-readable medium having computer-readable code embodied therein for execution by a processor in an electronic device having a housing including a base, a touch-sensitive input assembly coupled to the housing and spaced from and moveable relative to the base to generate sound, an accelerometer housed within the housing, an actuating arrangement comprising a piezoelectric actuator between the base and the touch-sensitive input surface and arranged to receive a driving signal and move the touch-sensitive input surface relative to the base, and functional components in the housing comprising a memory and a processor operably coupled to the memory, the touch-sensitive input assembly, the actuating arrangement, and the accelerometer to cause the electronic device to determine an orientation of the electronic device, and adjust the driving signal to the actuating arrangement based on the orientation of the electronic device to counter-act the effect of gravity on the touch-sensitive input assembly.

* * * * *